A. RANKEILLOR.
SHAFT BUSHING.
APPLICATION FILED DEC. 17, 1909.

1,040,579.

Patented Oct. 8, 1912.

WITNESSES =
M. E. Flaherty.
George Langton.

INVENTOR =
Alexander Rankeillor.
By
his attorneys.

UNITED STATES PATENT OFFICE.

ALEXANDER RANKEILLOR, OF SACO, MAINE, ASSIGNOR, BY MESNE ASSIGNMENTS, TO SACO-PETTEE COMPANY, OF NEWTON, MASSACHUSETTS, A CORPORATION OF MASSACHUSETTS.

SHAFT-BUSHING.

1,040,579.  Specification of Letters Patent.  Patented Oct. 8, 1912.

Application filed December 17, 1909. Serial No. 533,535.

*To all whom it may concern:*

Be it known that I, ALEXANDER RANKEILLOR, of Saco, in the county of York and State of Maine, a citizen of the United States, have invented a new and useful Improvement in Shaft-Bushings, of which the following is a specification.

My present invention relates to a bushing especially adapted for use in supporting a long shaft where there may be a tendency on the part of the shaft to sag. In such cases where the shaft is supported in the samsons or uprights on which the machine is built and passes through openings therein bushings are used in such openings, and it is desirable that such bushings be capable of self-adjustment according to the requirements of the shaft.

My invention consists in a bushing which will aline itself with the shaft and may provide simple means of applying lubrication and while it is held in place in the support it is easily removable so that the shaft may be withdrawn if desired.

My invention will be understood by reference to the drawings in which a form thereof is shown.

Figure 1:
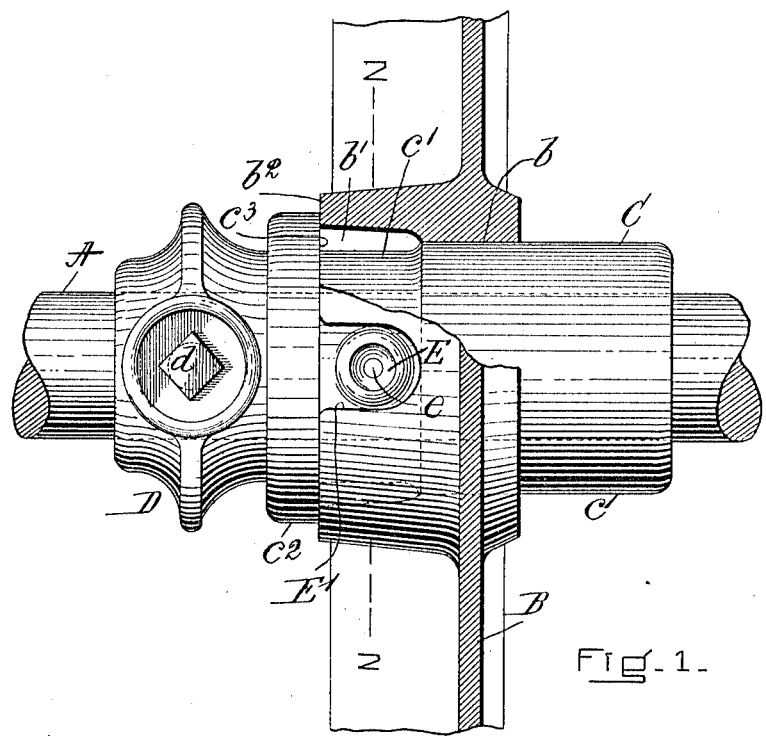
Figure 2:
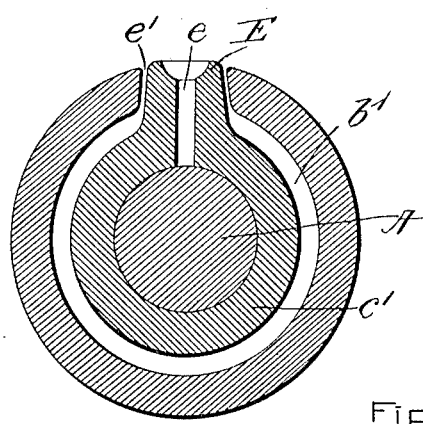

Figure 1 is a plan partly in section of one form of bushing comprising my invention, Fig. 2 being a vertical section on line 2—2 of Fig. 1.

In all the views A is the shaft and B is the samson or upright. In each form of my invention the samson is provided with an opening within which is the bushing C through which the shaft passes. Either the samson or support or the bushing, or both, is cut away to form a clearance between the surface of said bushing and the wall of said opening, and extending to the end of said opening, so as to allow the bushing to rock or settle itself in place in the support according to the requirements of the shaft. As herein shown both of said parts are so formed. The opening has a flange or collar comprising a bearing $b$ for the bushing which bearing surface is short with relation to the length of said bushing, and a portion $b^1$ which is cut away or of larger diameter than the bushing so as to provide the clearance above referred to. The outer edge $b^2$ of this clearance section serves as a stop to engage a corresponding portion of the bushing and assist in holding it in place.

The outer surface of the bushing C comprises what may be termed a supporting or bearing section $c$, which fits the bearing $b$ of the samson, a section $c^1$ cut away or reduced in diameter to contribute to the clearance above mentioned, and a stop section $c^2$ of slightly larger diameter than the largest diameter of the clearance $b^1$ in the samson. The face $c^3$ of the stop section is finished to engage the edge $b^2$ of the clearance at the exterior face of the support, and it serves to prevent the bushing from being driven too far into the samson when the bushing is put in place. The bushing is kept from endwise movement by a collar D which is preferably clamped on the shaft A by a screw $d$. The bushing C is provided with a spout E which is either cast integral with it as shown, or which may be made separately and screwed into the bushing. In the former case it provides an oiling passage $e$ which leads to the shaft A for lubrication purposes, and in the latter the passage through it registers with an opening $e^1$ in the bushing itself for the same purpose. But in addition this spout serves to keep the bushing from rotation. For this purpose in the form of my invention shown in Figs. 1 and 2 an opening $E^1$ is provided in the samson into which the spout E sets when the bushing is in place. This opening is sufficiently large to allow the bushing to settle itself into position but not large enough to allow the spout and bushing to turn.

Other varieties of this construction will occur to those skilled in the art.

While the support for the bushing is referred to as a samson it may be any other stationary part, for example, a bracket or hanger.

I have referred to the spout as being perforated or provided with a passage therethrough for lubricating purposes, but if it is not so provided it may still act as a projection to prevent the rotation of the bushing. Moreover I have shown the clearance between the bushing and support as made partly from the bushing and partly from the support. Instead it may be made entirely either from the support or from the bushing if thought best.

What I claim as my invention is:—

The bushing above described having a bearing section, a clearance and a stop section, said clearance being located between said bearing section and said stop section, in combination with a support having a portion engaging the bearing section of said
5 bushing and an exterior surface engaging the stop section of said bushing, and means for holding said bushing from endwise movement with relation to said support, said means comprising a shaft and a collar located thereon.

ALEXANDER RANKEILLOR.

Witnesses:
HOMER T. WATERHOUSE,
JOSEPH R. PAQUIN.

Copies of this patent may be obtained for five cents each, by addressing the "Commissioner of Patents, Washington, D. C."